US007782302B2

(12) United States Patent
Lee et al.

(10) Patent No.: US 7,782,302 B2
(45) Date of Patent: Aug. 24, 2010

(54) TRACKBALL FOR A MOBILE DEVICE

(75) Inventors: Chunkwok Lee, San Jose, CA (US);
Kevin Gong, Belmont, CA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 11/484,105

(22) Filed: Jul. 10, 2006

(65) Prior Publication Data

US 2008/0007571 A1    Jan. 10, 2008

(51) Int. Cl.
G06F 3/033 (2006.01)
G06F 3/00 (2006.01)
G06F 3/048 (2006.01)
G09G 5/08 (2006.01)

(52) U.S. Cl. .................. 345/167; 715/700; 715/810; 715/835

(58) Field of Classification Search ......... 715/781–800, 715/700, 856, 835, 810; 345/167
See application file for complete search history.

(56) References Cited

U.S. PATENT DOCUMENTS

| 4,404,865 | A | * | 9/1983 | Kim ...................... 74/471 XY |
| 4,575,086 | A | * | 3/1986 | Kim et al. ..................... 74/417 |
| 5,760,773 | A | * | 6/1998 | Berman et al. .............. 715/808 |
| 5,929,840 | A | * | 7/1999 | Brewer et al. ............... 715/862 |
| 5,977,972 | A | * | 11/1999 | Bates et al. ................. 715/786 |
| 7,626,573 | B2 | | 12/2009 | Lee |
| 2004/0125150 | A1 | * | 7/2004 | Adcock et al. .............. 345/810 |

FOREIGN PATENT DOCUMENTS

| EP | 2044505 | 4/2009 |
| WO | WO2008008267 | 1/2008 |

OTHER PUBLICATIONS

"Non Final Office Action", U.S. Appl. No. 11/484,237, (Aug. 19, 2008),16 pages.
"Final Office Action", U.S. Appl. No. 11/484,237, (Apr. 7, 2009),7 pages.
"Notice of Publication", Application Serial No. 200780026383.8, Patent Gazette for Invention,(Aug. 21, 2009),vol. 25, Issue No. 31.
"Notice of Allowance", U.S. Appl. No. 11/484,237, (Aug. 31, 2009),8 pages.

* cited by examiner

Primary Examiner—Kee M Tung
Assistant Examiner—Jacinta Crawford

(57) ABSTRACT

A graphical user interface which employs logical barriers for temporarily preventing cursor movement between graphical elements under certain circumstances. For example, one embodiment of the invention comprises a data processing device having a memory for storing program code and a processor for processing the program code to generate a graphical user interface (GUI), the GUI comprising: a first predefined region including of a first plurality of selectable graphical elements; a second predefined region including a second plurality of selectable graphical elements; and a logical barrier between the first predefined region and the second predefined region, the logical barrier configured to temporarily prevent movement from a graphical element in the first predetermined region to a graphical element in the second predetermined region in response to a user input directed towards graphical element in the second predetermined region, the logical barrier temporarily preventing the movement for either a specified period of time and/or a specified amount of movement generated by a user input device.

8 Claims, 22 Drawing Sheets

A "Word" is (contiguously):
- 1 or more letters
- 1 or more digits
- 1 or more spaces or tabs
- 1 double byte character only
- 1 other symbol/character only sapien123 1-2234-566!!!
sapien123 1-2234-566!!!
sapien123 1-2234-566!!!
sapien123 1-2234-566!!!
sapien123 1-2234-566!!!
sapien123 1-2234-566!!!
sapien123 1-2234-566!!!
sapien123 1-2234-566!!!
sapien123 1-2234-566!!!
sapien123 1-2234-566!!!
sapien123 1-2234-566!!!

*Fig. 8*

TRACKBALL FOR A MOBILE DEVICE

TECHNICAL FIELD

This application relates generally to the field of data processing devices, and more particularly, to versatile input/output and display configurations for a data processing device.

BACKGROUND

Portable data processing devices such as Personal Digital Assistants ("PDAs") and programmable wireless telephones are becoming more powerful every day, providing users with a wide range of applications previously only available on personal computers. At the same time, due to advances in silicon processing technology and battery technology, these devices may be manufactured using smaller and smaller form factors. Accordingly, users no longer need to sacrifice processing power for portability when selecting a personal data processing device.

Although processing devices with small form factors tend to be more portable, users may find it increasingly difficult to interact with them. For example, entering data may be difficult due to the absence of a full-sized keyboard and reading information may be difficult due to a small, potentially dim Liquid Crystal Display ("LCD").

To solve some of these problems, the assignee of the present application developed two data processing devices known commercially as the "Sidekick" and the "Sidekick II," respectively. The Sidekick is illustrated in FIGS. 1a-c. This data processing device 100 includes a keyboard 101, a control knob/wheel 102 (e.g., for scrolling between menu items and/or data), and a set of control buttons 105 (e.g., for selecting menu items and/or data).

The display 103 is pivotally coupled to the data processing device 100 and pivots around a pivot point 109, located within a pivot area 104, from a first position illustrated in FIG. 1a to a second position illustrated in FIGS. 1b-c. When in the first position the display 103 covers the keyboard 101, thereby decreasing the size of the device 100 and protecting the keyboard 101. Even when the display is in the first position, however, the control knob 102 and control buttons 105 are exposed and therefore accessible by the user. The motion of the display 103 from the first position to a second position is indicated by motion arrow 106 illustrated in FIGS. 1a-b. As illustrated, when in the second position, the keyboard 101 is fully exposed. Accordingly, the display is viewable, and data is accessible by the user in both a the first position and the second position (although access to the keyboard is only provided in the first position).

In one embodiment, the data processing device 100 is also provided with audio telephony (e.g., cellular) capabilities. To support audio telephony functions, the embodiment illustrated in FIGS. 1a-c includes a speaker 120 for listening and a microphone 121 for speaking during a telephone conversation. Notably, the speaker 120 and microphone 121 are positioned at opposite ends of the data processing device 100 and are accessible when the screen 103 is in a closed position and an open position.

The Sidekick II is illustrated in FIGS. 2a-b. This data processing device 200 includes many of the same features as the Sidekick such as, for example, a pivoting display 205 which reveals an alphanumeric keyboard 305 and a control wheel 230. In addition, the Sidekick II includes a directional pad 245 for performing cursor control operations and an integrated speaker 246 and LED (not shown).

As mentioned above, the control wheels 102 and 230 in these and other devices may be used to scroll through lists of items such as menu items and/or data entry fields. However, one limitation of the scroll wheel is that it is only capable of navigating within a single dimension. For example, by manipulating the control wheel 112, a user may move a graphical selection element either "up" or "down" in relation to the orientation of the screen (or "left" or "right" depending on how the user interface is programmed). However, the control wheel does not allow the user to navigate in any desired direction on the screen. Accordingly, a more flexible user interface solution for navigating within a graphical interface of a mobile device is needed.

SUMMARY

A graphical user interface is described below which employs logical barriers for temporarily preventing cursor movement between graphical elements under certain circumstances. For example, one embodiment comprises a data processing device having a memory for storing program code and a processor for processing the program code to generate a graphical user interface (GUI), the GUI comprising: a first predefined region including a first plurality of selectable graphical elements; a second predefined region including a second plurality of selectable graphical elements; and a logical barrier between the first predefined region and the second predefined region, the logical barrier configured to temporarily prevent movement from a graphical element in the first predefined region to a graphical element in the second predefined region in response to a user input directed towards the graphical element in the second predefined region, the logical barrier temporarily preventing the movement for either a specified period of time and/or a specified amount of movement generated by a user input device.

BRIEF DESCRIPTION OF THE DRAWINGS

A better understanding of trackball for a mobile device can be obtained from the following detailed description in conjunction with the following drawings, in which:

FIGS. 6a-c illustrate one embodiment of the invention for navigating and editing text fields.

FIG. 8 illustrates additional techniques for selecting text according to one embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Several different techniques for implementing a trackball on a mobile data processing device are described below. As will be apparent from the following description, many of these configurations are particularly beneficial when employed on a dual-purpose data processing device such as a personal digital assistant ("PDA") or other mobile computing device having integrated wireless telephony capabilities (e.g., a combination PDA and cell phone). However, it should be noted that the underlying principles of the invention are not limited to a wireless telephony configuration.

Figure 1A:
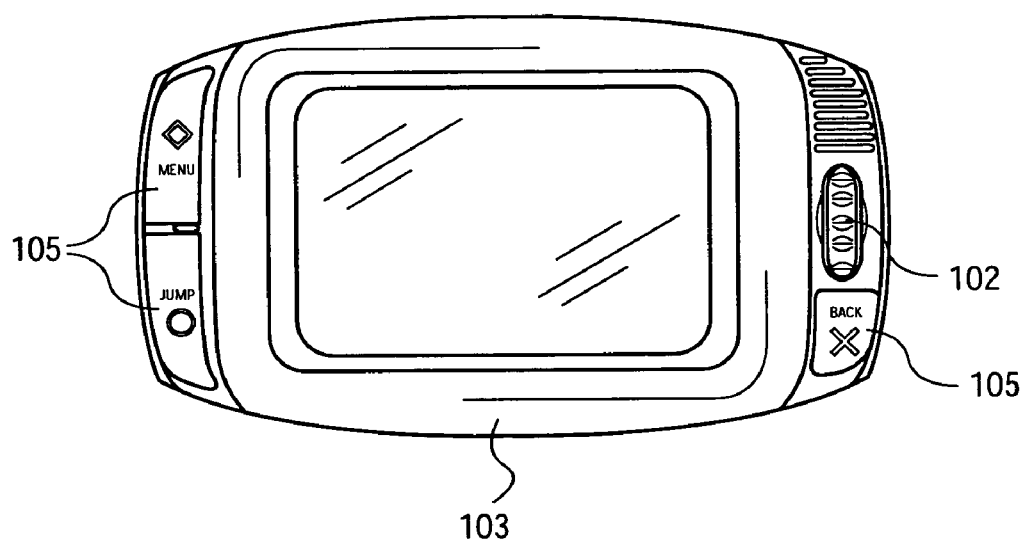
FIGS. 1a-c illustrate a prior art data processing device with a control wheel and an adjustable display.
Figures 1B, 1C:
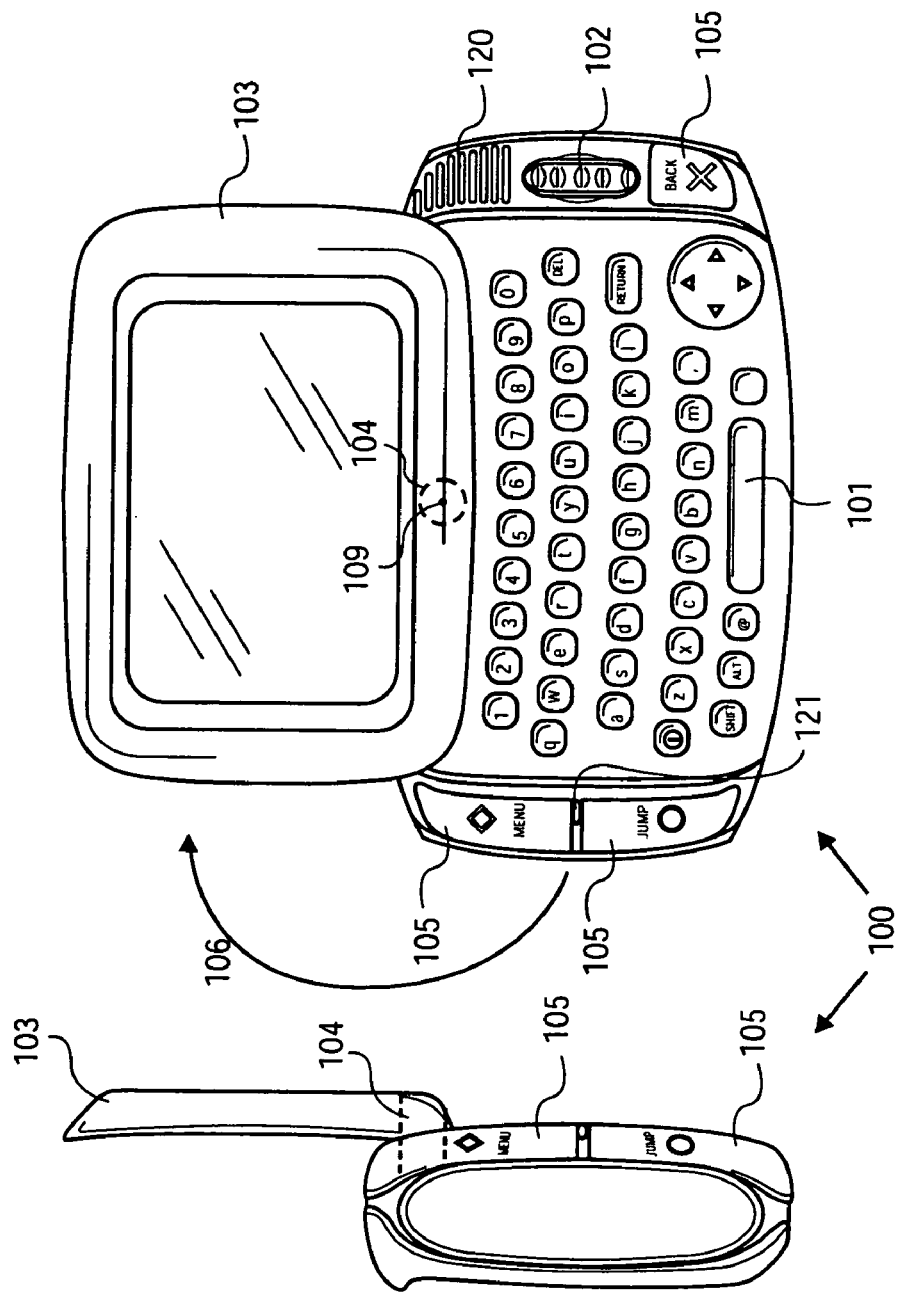
Figure 2A:
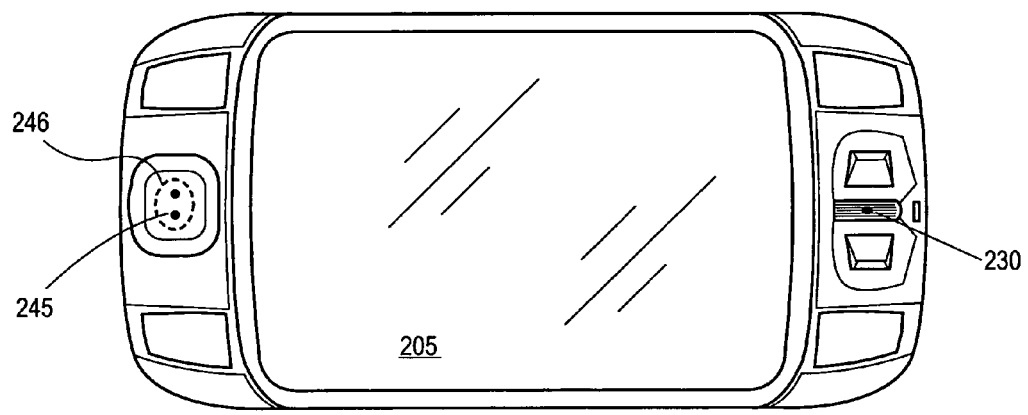
FIGS. 2a-b illustrate another prior art data processing device with a control wheel and a display.
Figure 2B:
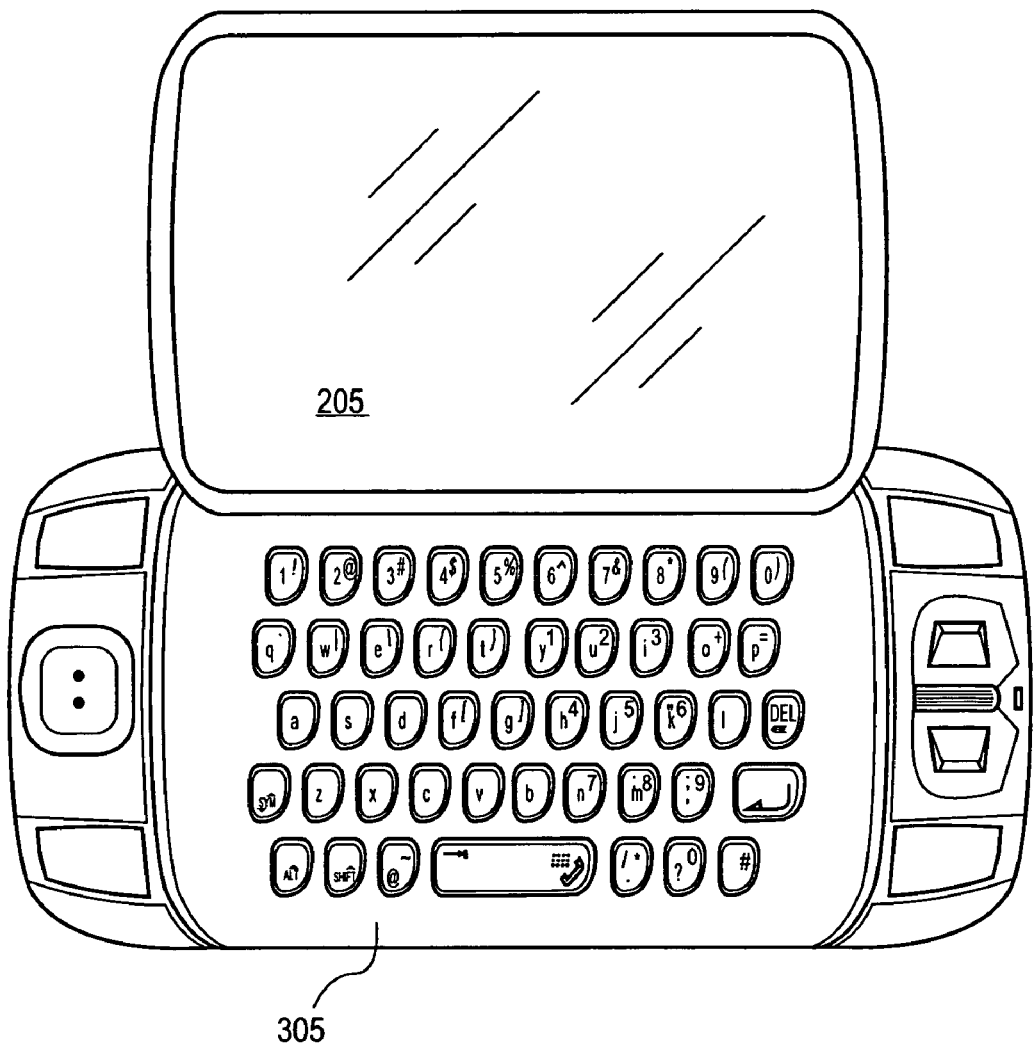
Figure 3A:
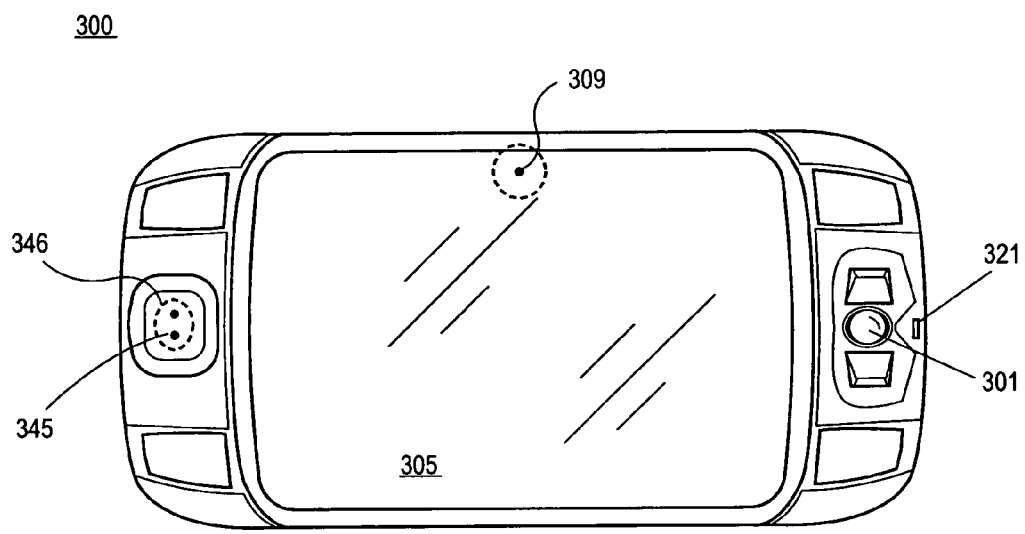
FIGS. 3a-b illustrate one embodiment of a data processing device with a trackball.
Figure 3B:
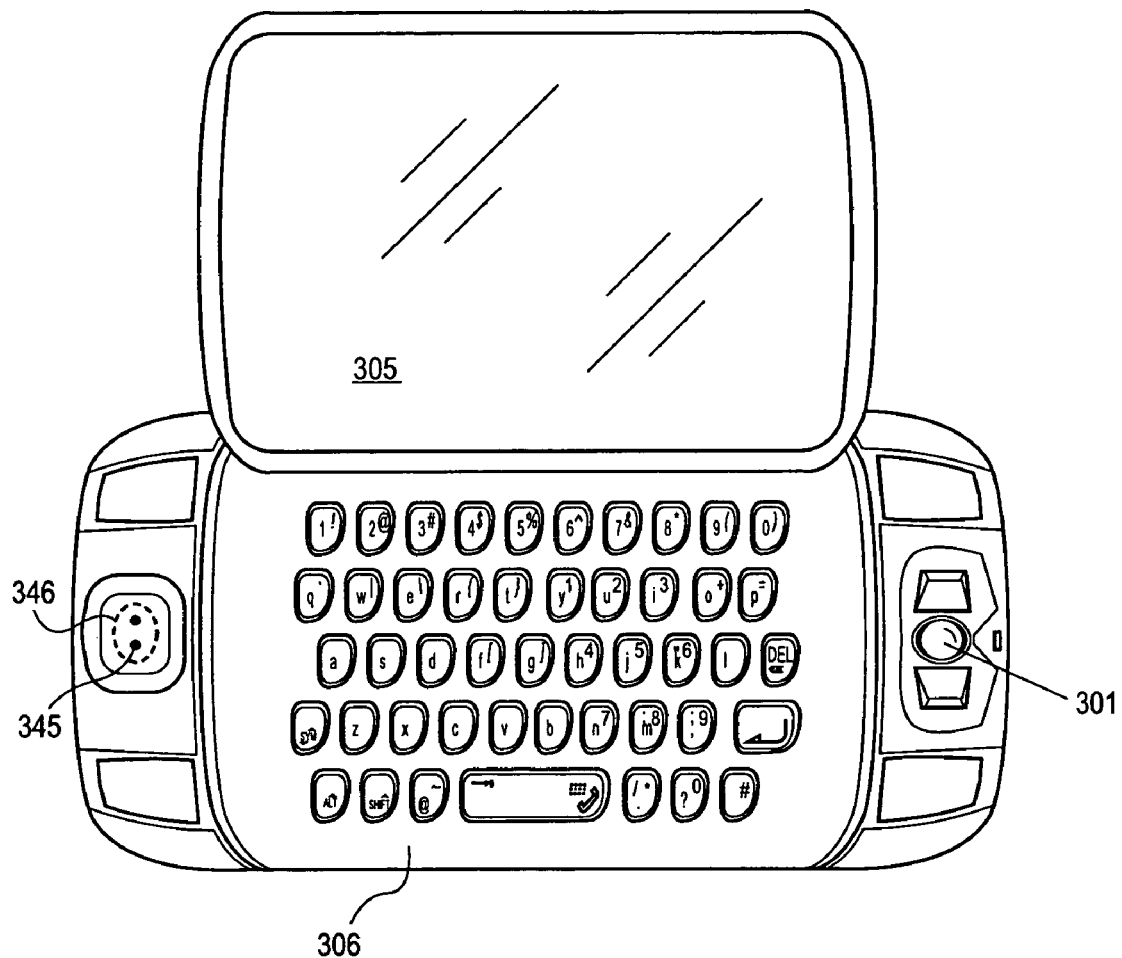

A data processing device 300 according to one embodiment of the invention is illustrated in FIGS. 3a-b. Unlike the prior data processing devices described above, this data processing device 300 includes a trackball 301 for navigating through graphical images and text displayed on the data processing device display 305. In addition, in one embodiment, the trackball 301 may be clicked down into the data processing device to generate a selection function (i.e., similar to the functions provided by a standard mouse button).

In one embodiment, the data processing device 300 display adjusts as in the prior data processing devices described above. For example, in one embodiment, the display 305 is pivotally coupled to the data processing device 300 and pivots around a pivot point 309 from a first position illustrated in FIG. 3a to a second position illustrated in FIG. 3b.

When in the first position the display 305 covers the keyboard 306, thereby decreasing the size of the device 300 and protecting the keyboard 306. Even when the display is in the first position, however, the trackball 301 and control buttons, such as directional pad 345, are exposed and therefore accessible by the user. As illustrated in FIG. 3b, when in the second position, the keyboard 306 is fully exposed. Accordingly, the display is viewable, and data is accessible by the user in both the first position and the second position (although access to the keyboard is only provided in the first position).

In one embodiment, the data processing device 300 is also provided with audio telephony (e.g., cellular) capabilities. To support audio telephony functions, the embodiment illustrated in FIGS. 3a-b includes a speaker 346 (embedded within the directional pad) for listening and a microphone 321 for speaking during a telephone conversation. Notably, the speaker 346 and microphone 321 are positioned at opposite ends of the data processing device 300 and are accessible when the screen 305 is in a closed position and an open position.

Implementing a trackball 301 on a portable data processing devices presents several unique challenges. For example, the relatively small display screen may provide inadequate space for a true "point-and-click" environment (e.g., such as a Windows environment in which is user is provided the ability to move a pointer and click on any graphic on the screen). That is, the graphics displayed on the data processing device display may be so small and close together that moving a cursor to the correct position to identify an icon may be difficult. In addition, with mobile devices, users often do not have the same focus as with a standard personal computer (e.g., users are not sitting at a desk when using a mobile device). Accordingly, simplified navigation techniques for use with a trackball are needed.

In one embodiment of the invention, to simplify navigation, in response to user manipulation of the trackball, a "selection element" or "selection graphic" traverses through a limited number of selectable user interface elements displayed within the user interface (e.g., data fields, menu items, text, etc). This approach eliminates unnecessary trackball movement by the user, prevents user errors, and makes the graphical navigation as efficient as possible.

General Trackball Navigation

Figure 4A:
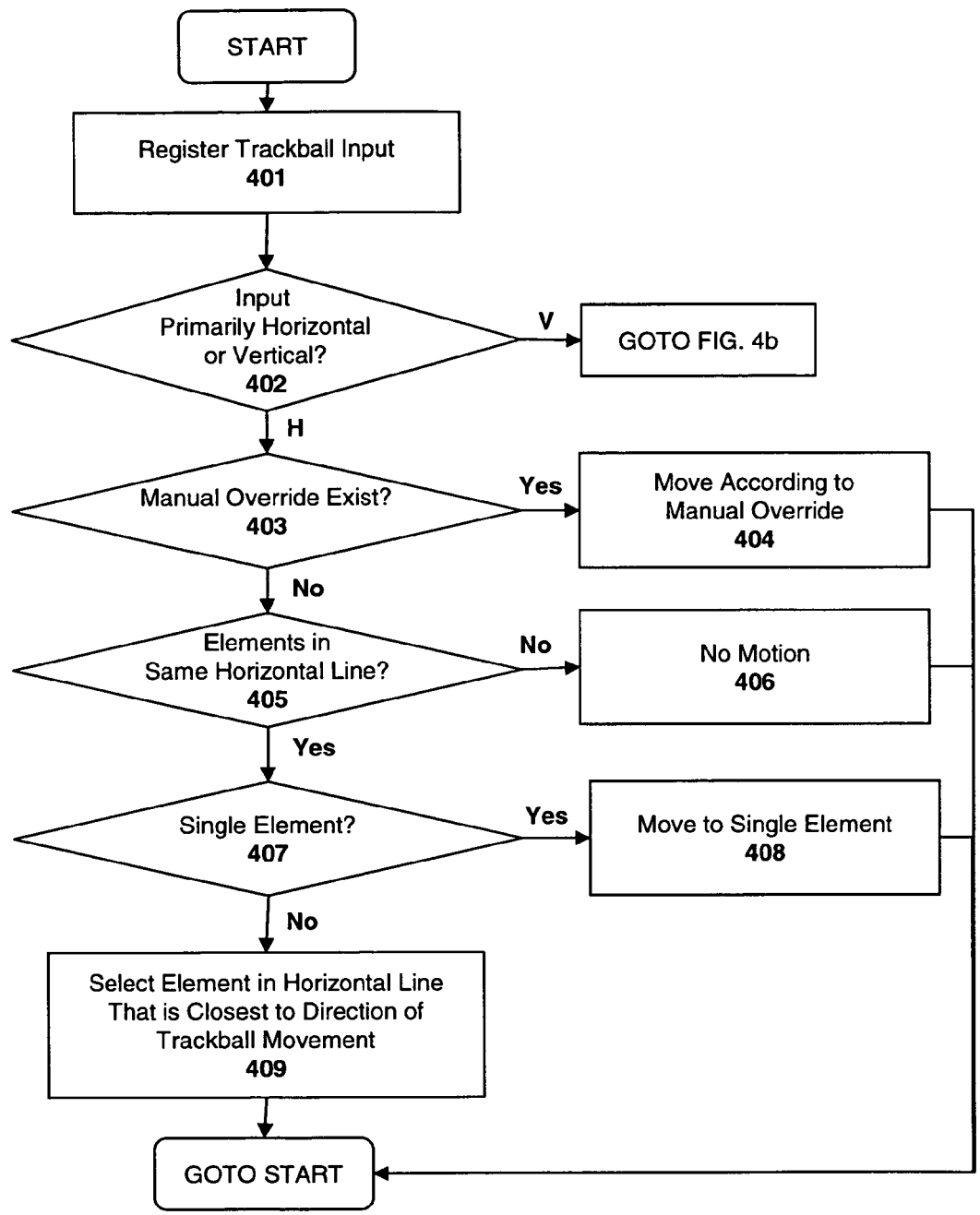
FIGS. 4a-b illustrate one embodiment of a method for navigating within a graphical user interface using a trackball.
Figure 4B:
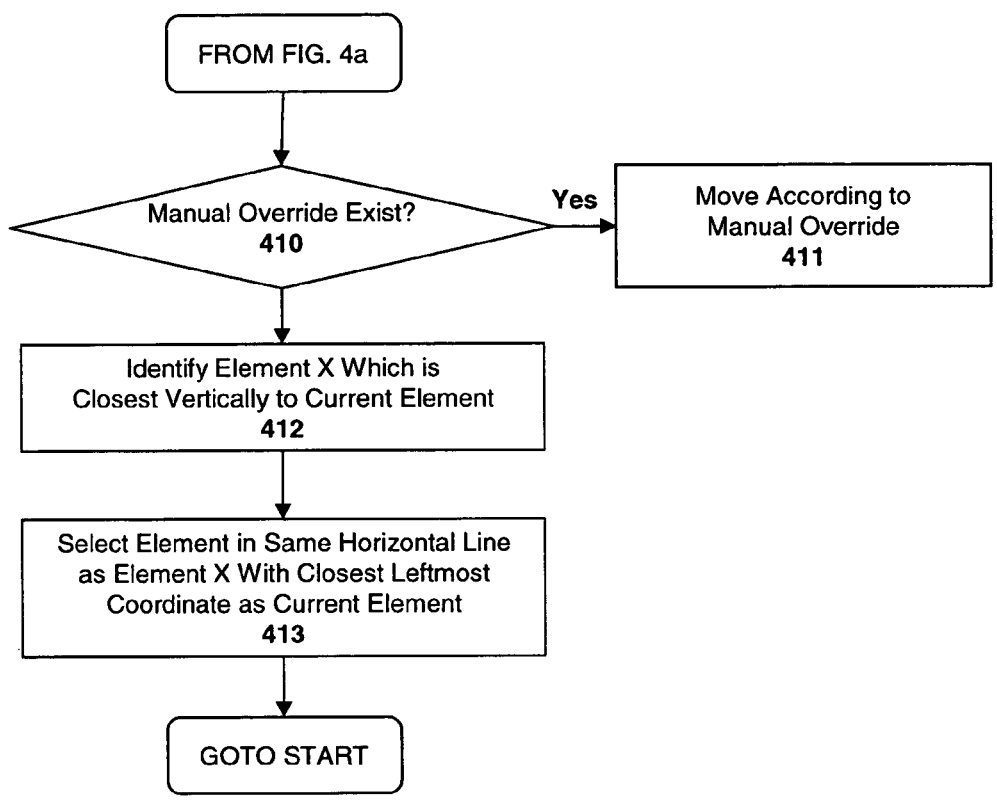

One embodiment of a method for selecting elements using a trackball input device is illustrated in FIGS. 4a-b. The term "element" is used broadly in this context to refer to any type of image on a display screen including, for example, data input fields, menu items, text and graphical icons. Following the description of FIGS. 4a-b, a series of specific examples within a graphical user interface will be provided in FIGS. 5a-f.

Turning to FIG. 4a, at 401, the data processing device registers a trackball input from a user. At 402 a determination is made as to whether the user input is primarily a horizontal input (e.g., left or right) or primarily a vertical input (e.g., up or down). Given that the user may scroll the trackball in virtually any direction, the input may inadvertently include both horizontal and vertical components. One embodiment of the data processing device 300 determines whether the input is a "horizontal" input or a "vertical" input based on the relative horizontal and vertical components of the input (i.e., the input is a vector with both horizontal and vertical components). If the input has a relatively larger horizontal component, then subsequent trackball movements will be biased to continue horizontally; conversely, if the input has a relatively larger vertical component, then subsequent trackball movements will be biased vertically.

If the input is identified as vertical, then the process flows to FIG. 4b (described below). If the input is identified as horizontal, then the process flows to 403 where a determination is made is to whether a manual override exists for the requested motion 403. For example, in some cases, the core techniques described below for selecting an element within a user interface may not be desirable. In these cases, the user interface programmer may manually identify the desired operation for the user interface. For example, if the techniques described below would cause an element to be selected which is unlikely to be the element that a user would wants to select, then the manual override will cause a different (more likely desired) element to be selected.

Figure 4C:
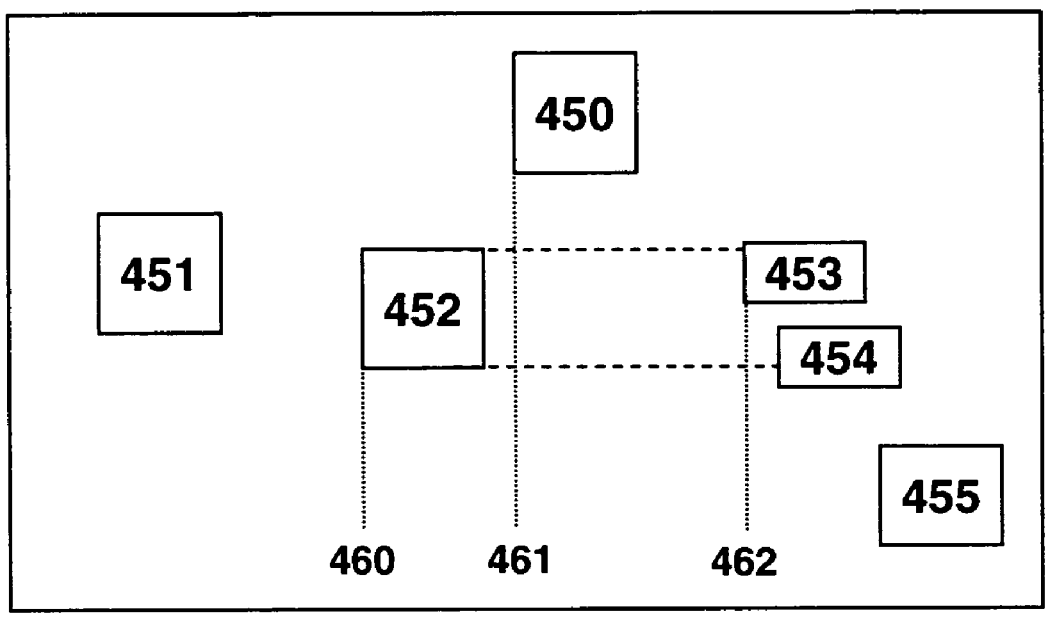
FIG. 4c illustrates an exemplary GUI on which embodiments of the invention may be implemented.

If no manual override exists, then at 405 a determination is made as to whether elements exist within the same horizontal line as that occupied by the current element—that is, whether another element exists which includes at least some overlapping vertical coordinates with the current element. For example, in FIG. 4c, elements 453 and 454 are in the same horizontal "line" as element 452 because at least some of their vertical coordinates overlap.

If no elements are in the same horizontal line as the current element, then no new element is selected at 406. For example, if the user scrolls the trackball 301 to the left/right and if no elements exist to the left/right (within the range of vertical coordinates occupied by the current element), then no new element will be selected.

If, however, elements exist within the range of vertical coordinates defined by the current element, then at 407 a determination is made as to whether more than one element exists with overlapping vertical coordinates. If so, then at 406, the one element is selected. If not, then at 409 the element in the same horizontal line which is closest to the direction of the trackball motion will be selected. For example, in FIG. 4c, if element 452 is currently selected and the user scrolls right and slightly upward, then element 453 will be selected. Conversely, if element 452 is currently selected and the user scrolls right and slightly downward, then element 454 will be selected. Alternatively, in one embodiment, the element with a relatively larger vertical coordinate is automatically selected (i.e., the element relatively closer to the top edge of the display—element 453 in the example).

FIG. 4b illustrates a process for selecting an element in response to a vertical motion (i.e., moving the trackball up or down in relation to the display). At 410, a determination is made as to whether a manual override exists. If so, then the new element is selected in accordance with the manual override at 411. If not, then at 412, the element X which is closest vertically to the current element is identified. For example, in FIG. 4c, the element closest vertically to element 450 is element 451. At 413, the element in the same horizontal line as element X (or element X if there are no other elements in the same horizontal line) with the closest left-most coordinate to the current element is selected. For example, in FIG. 4c, element 452 is selected in response to a downward movement from element 450 because the leftmost coordinate 460 of element 452 is closest to the leftmost coordinate 461 of element 450 (e.g., it is closer on the horizontal axis than the leftmost element 462 of element 453).

Various alternate and/or additional techniques may be used to select the next element in response to a trackball signal. For example, in one embodiment, in response to a vertical or horizontal movement signal, the element having the largest horizontal range or vertical range, respectively overlapping with the current element may be selected. Various other techniques for selecting the next element may be employed while still complying with the underlying principles of the invention.

Figure 5A:
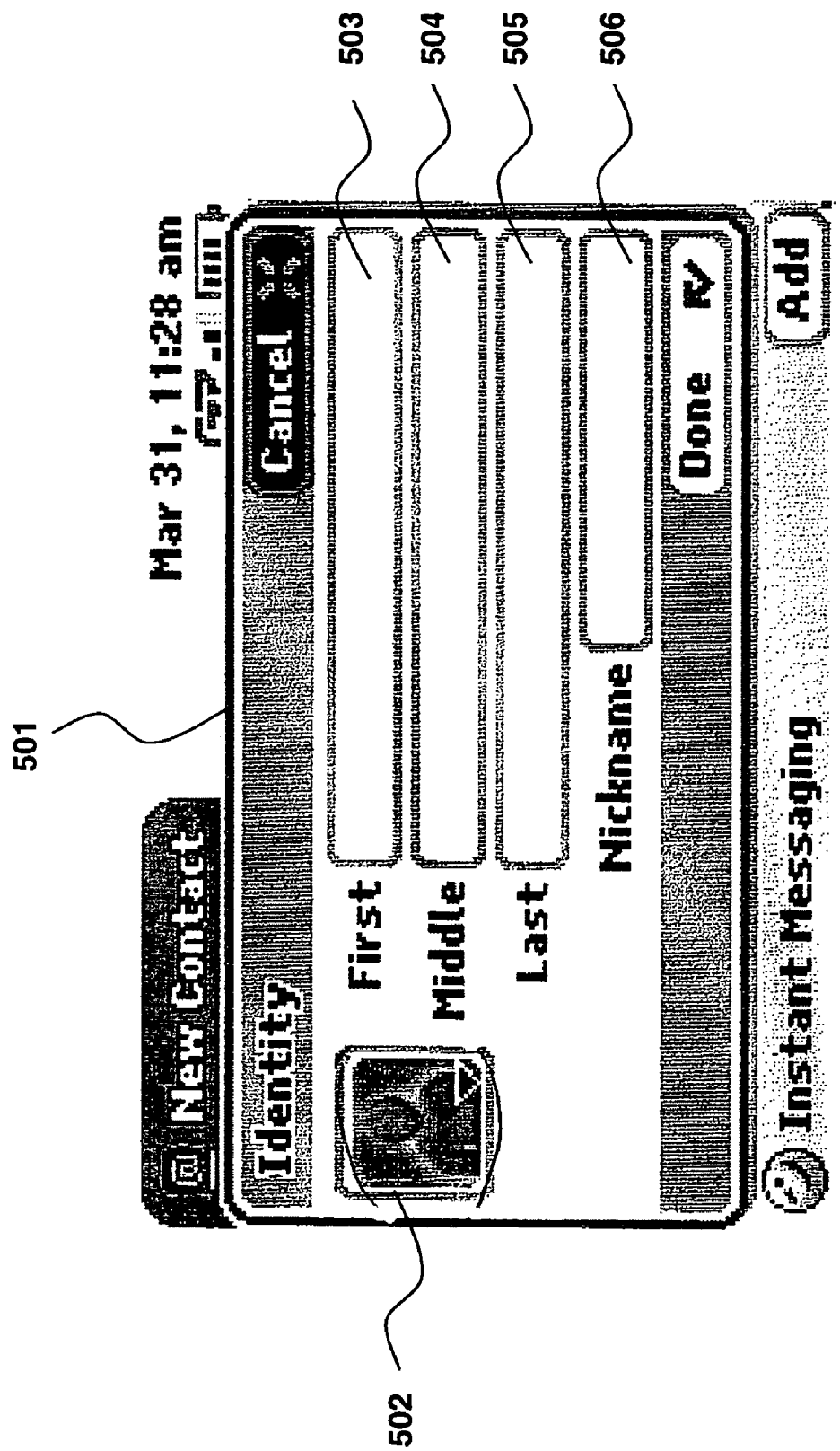
FIGS. 5a-f illustrate exemplary graphical user interfaces within which the method of FIGS. 4a-b may be employed.

FIGS. 5a-f illustrate specific examples of the foregoing processes (assuming that no manual overrides exist). FIG. 5a illustrates a data entry box 501 with an icon picker element 502 for selecting an icon and data entry fields 503-506 for entering the name and nickname of a user. If the icon picker element 502 is initially selected (as shown) and the user scrolls horizontally to the right, then a determination is made that two data entry fields 503-504 have overlapping vertical coordinates with the icon picker element 502 (i.e., they are both generally to the right of the icon picker element 502). As such, the data entry field which has relatively higher vertical coordinates is selected—in this example, the "first name" field 503. If the user now the scrolls vertically downward, data fields 504-506 will be selected in succession. If the user scrolls to the left from either data entry field 505 or 506, no new element will be highlighted because no element to the left of these fields has vertical coordinates which overlap with these fields. By contrast, if the user scrolls to the left from either data entry field 503 or 504, the icon picker element will be selected because it shares overlapping vertical coordinates with these fields.

Figure 5B:
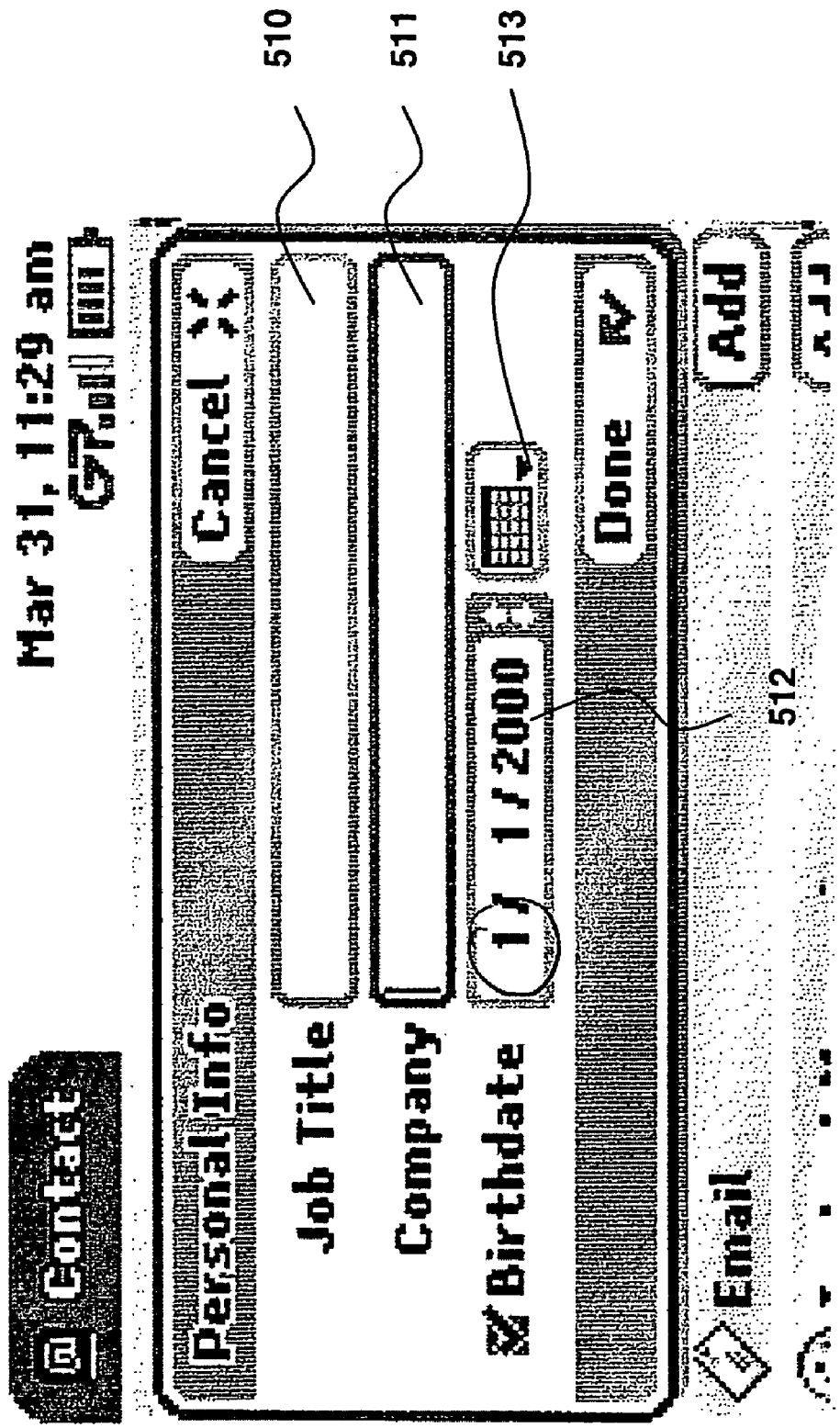

FIG. 5b illustrates another data entry box including data entry fields for Job Title 510, Company 511 and Birthdate 512 as well as a Month Picker element 513. If the currently selected element is the Company field 511 and the user scrolls down using the trackball, then the Birthdate field 512 will be selected because the leftmost coordinate of the Company element 511 is closest to the leftmost coordinate of the Birthdate element.

Figure 5C:
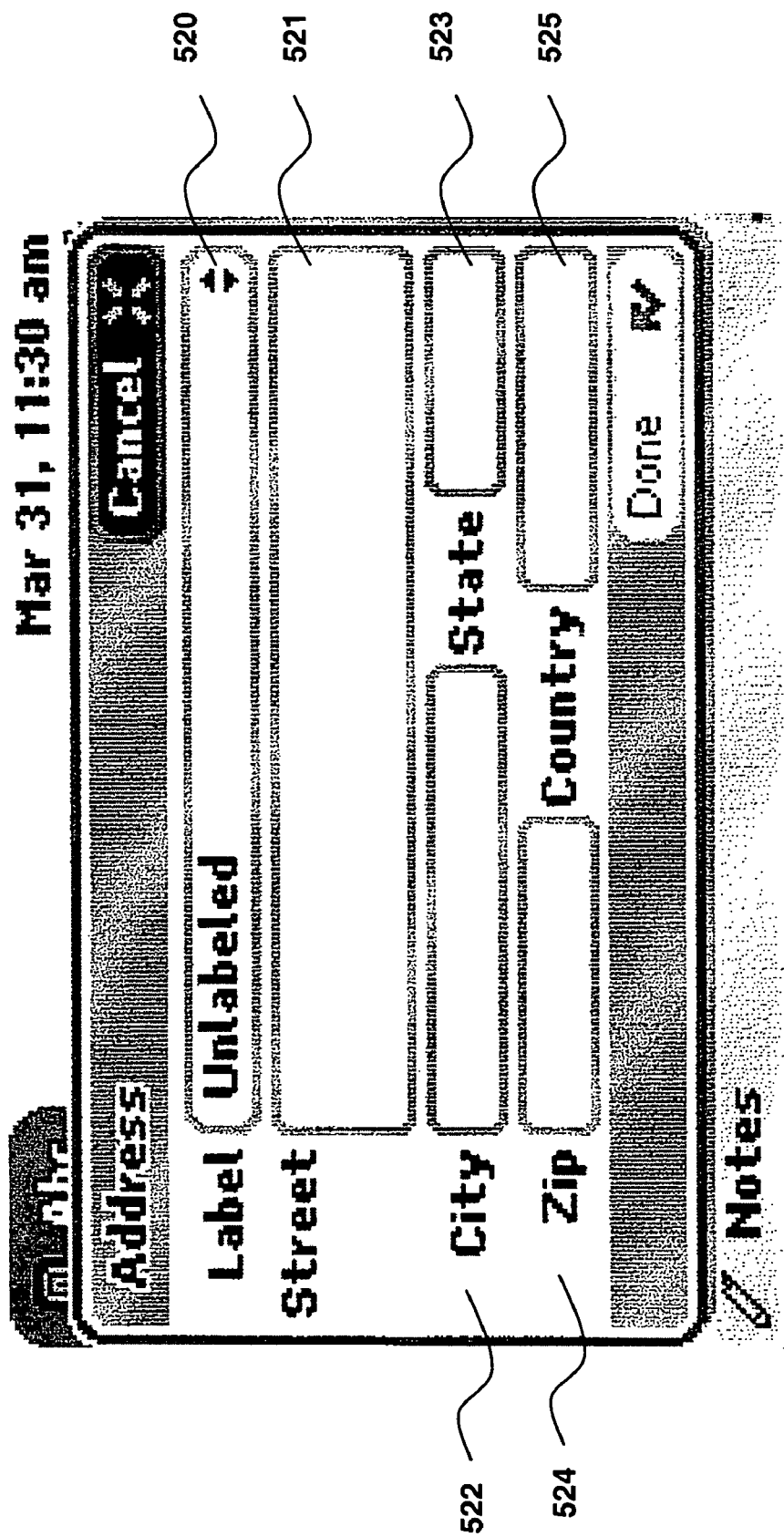

FIG. 5c illustrates an Address data entry box including data entry fields for Label 520, Street 521, City 522, State 523, Zip 524, and Country 525. If the currently selected element is the State field 523 and the user scrolls down using the trackball, then the Country field 525 will be selected because the leftmost coordinate of the Country field 525 is closest to the leftmost coordinate of the State field 523. Similarly, if the currently selected element is the Country field 525 and the user scrolls up using the trackball, then the State field 523 will be selected because the leftmost coordinate of the State field 523 is closest to the leftmost coordinate of the State field 525.

Figure 5D:
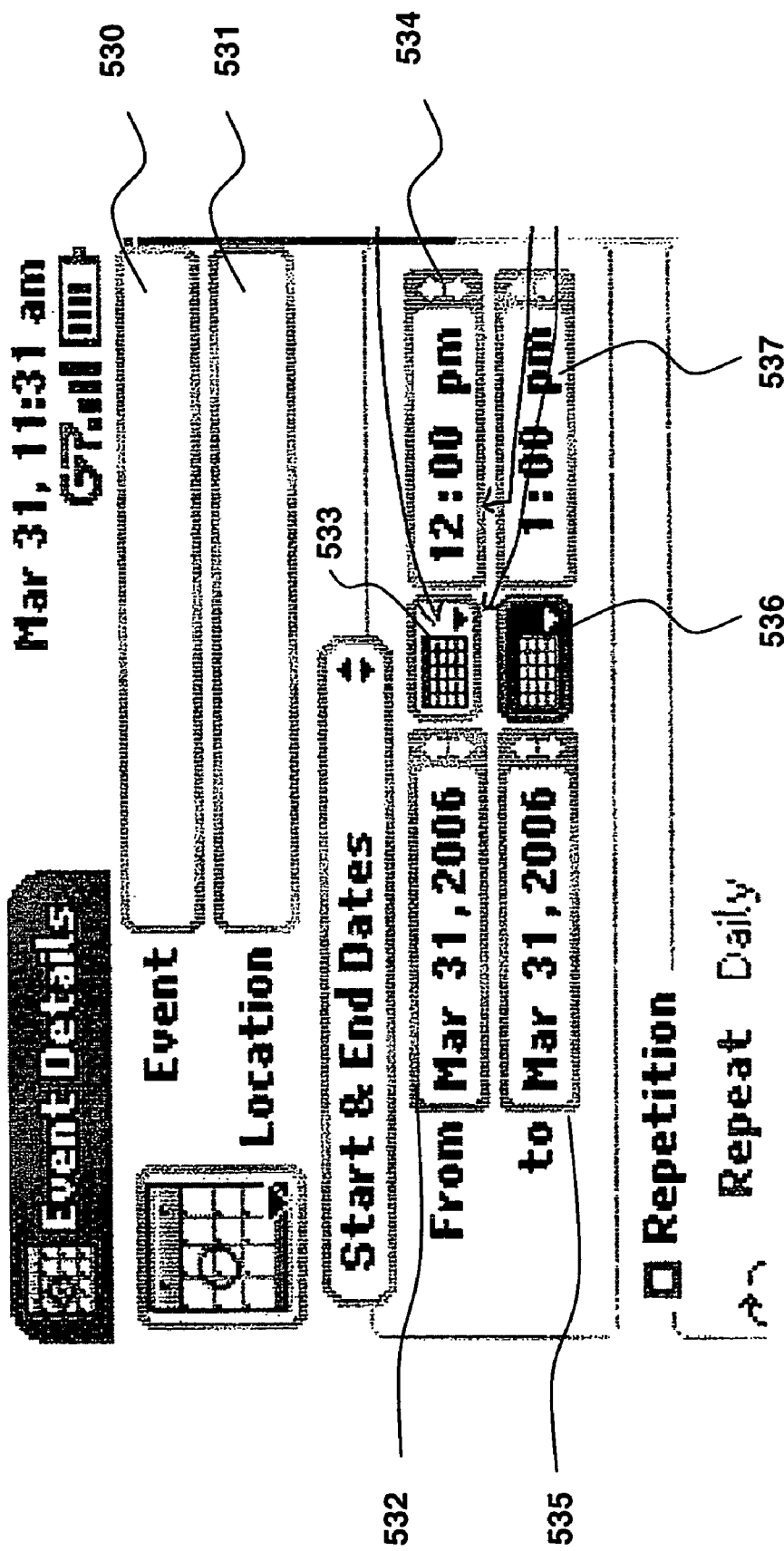

FIG. 5d illustrates a data entry box for specifying calendar event information including data entry fields for an event name 530, a location 531, a start date field 532, a month picker box for the start date 533 a time picker box for the start date 534, an end date field 535, a month picker box for the end date 536, and a time picker box for the end date 537. In this example, if the month picker box for the end date 536 is currently selected and the user scrolls up, the month picker box for the start date 533 will be selected because the leftmost coordinate of month picker box 536 is closest to the leftmost coordinate of month picker box 533. Thus, month picker box 533 is selected even though the start date field 532 and time picker box 534 are closer vertically by one pixel. One embodiment of the invention initially groups start date field 532, the month picker box 533 and the time picker box 534 together because they are in the same horizontal line and then picks the one with the closest left coordinate.

Figure 5E:
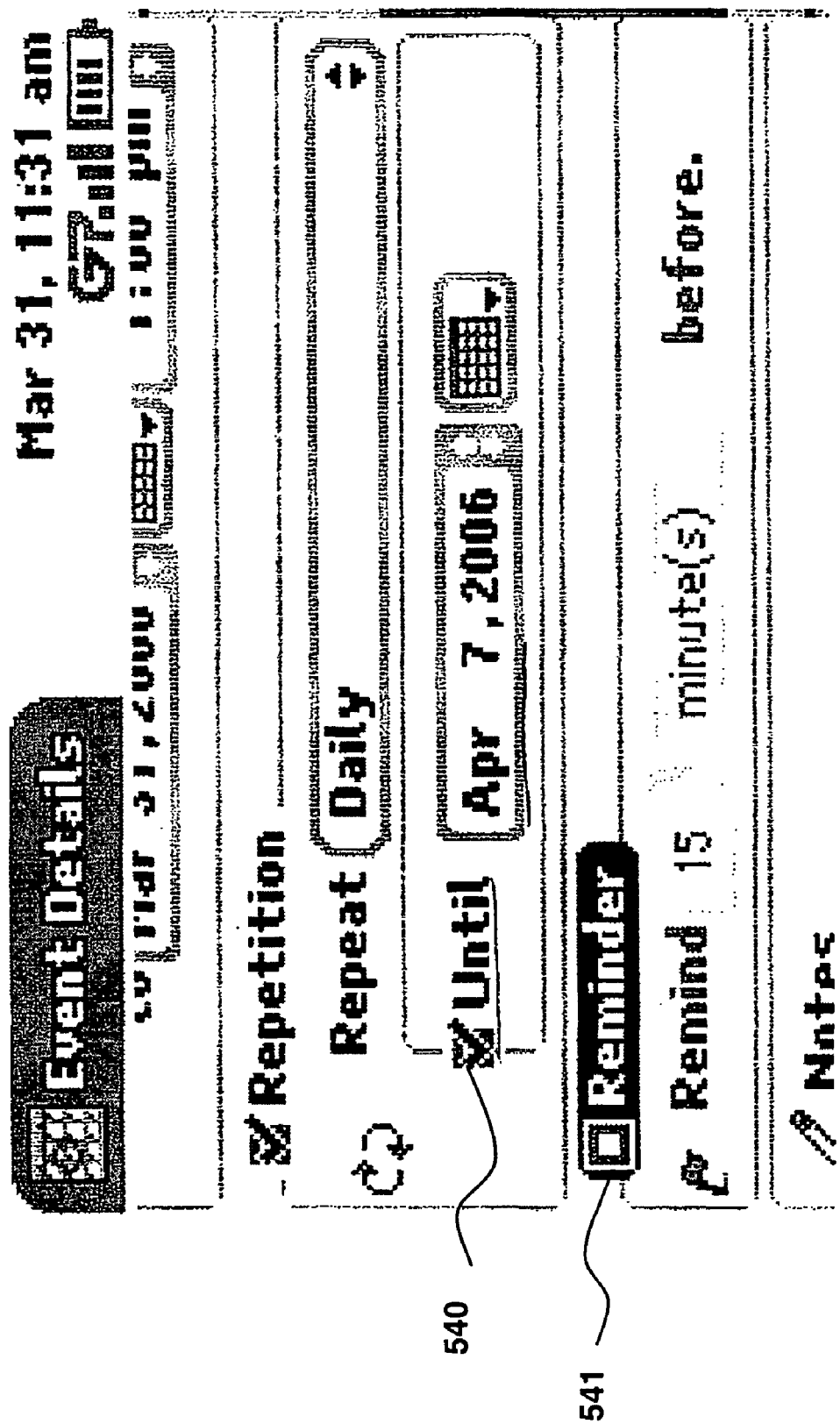

FIG. 5e illustrates another example that includes (among other elements) an Until check box 540 and a Reminder check box 541. In this example, if the currently selected element is the Reminder check box 541 and the user scrolls up using the trackball, then the Until check box 540 will be selected because the leftmost coordinate of the Until check box 540 is closest to the leftmost coordinate of the Reminder check box 541.

Figure 5F:
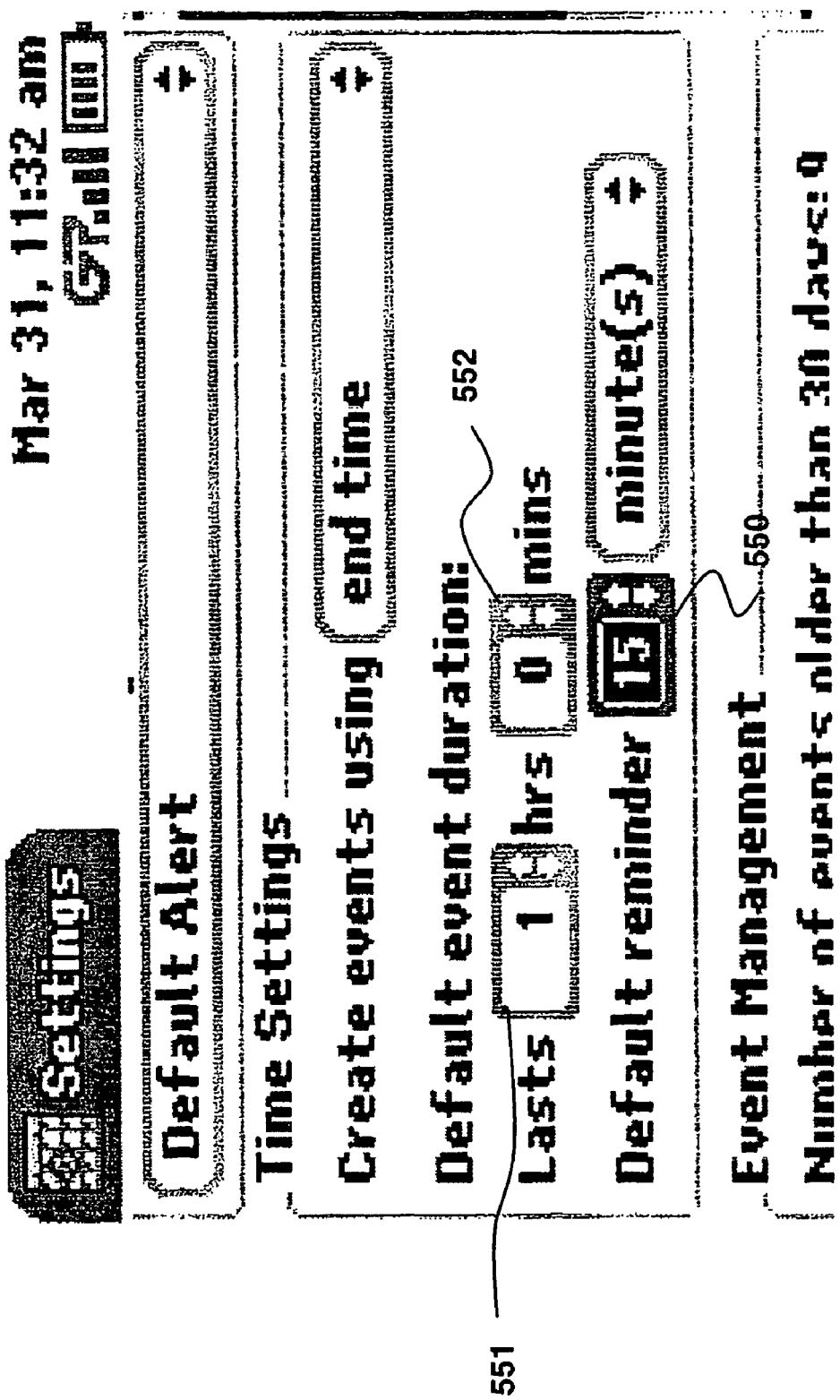

Similarly, FIG. 5f illustrates an example that includes a default reminder data entry field 550, an hour data entry field 551, and a minute data entry field 552. In this case, if the currently selected element is the default reminder data entry field 550 and the user scrolls up using the trackball, then the minute data entry field 552 will be selected because the leftmost coordinate of the minute data entry field 552 is closest to the leftmost coordinate of the default reminder data entry field 550.

Quick Edit Text Fields

One embodiment of the invention employs techniques for navigating and editing text entry fields using the trackball 301. Specifically, in this embodiment, scrolling the trackball 300 causes each of the text entry fields to be selected according to the techniques described above (e.g., based on leftmost data field coordinate when moving vertically and based on overlapping vertical coordinates when moving horizontally). When a particular text entry field is initially selected, the field is "focused" and a highlight is provided to indicate that the whole text field is selected. At this stage, typing on the keyboard 306 cases the current text within the field to be replaced by the newly entered text. By contrast, clicking the trackball 301 into the data processing device 300 or the directional pad 345 causes a cursor to enter the text entry field, thereby allowing the user to edit the text. Scrolling the trackball 301 with the cursor in the text and/or at the end of the text causes a new field to be selected and focused. By contrast, clicking on the directional pad 345 at this stage causes the cursor to move through the text of the selected field.

Figures 6A, 6B, 6C:
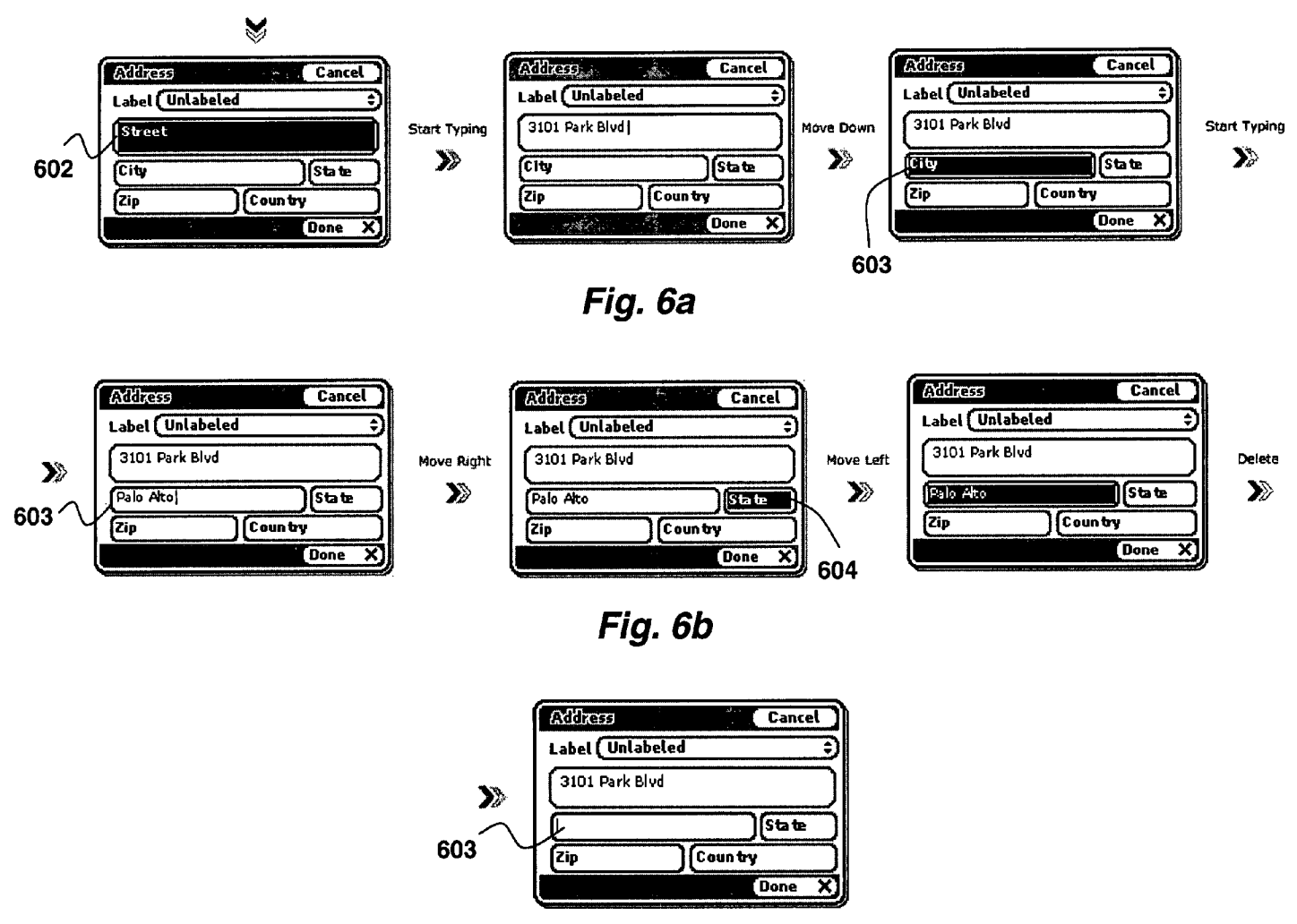

FIGS. 6*a-c* provide an example of the foregoing operation. In FIG. 6*a* a text entry field for entering a street 602 is initially selected. The entire text entry field is highlighted to provide an indication that text entry will replace the current contents of the field 602. In addition, unlike prior user interfaces, the label for the text entry field (e.g., "State") is provided as text within the field itself. In response to the user scrolling left on the trackball, the city field is once again highlighted. In the illustrated example, the user types a street number and then scrolls down on the trackball to cause a text entry field for entering a city 603 to become highlighted. As the user begins typing the city, the city label is replaced, as indicated in FIG. 6*b*. In response to a rightward scroll after the city is entered, a text entry field for entering a state 604 is highlighted. If the user does not enter text but instead scrolls left, all of the text for the previously-entered city is highlighted, as indicated in FIG. 6*b*. If the user then selects the delete button or types any text, the contents of the city text entry field are deleted or replaced, respectively, as indicated in FIG. 6*c*.

In one embodiment, a new text entry field is selected in response to a trackball motion only if the cursor is at the beginning or end of the text within the current text entry field and the cursor is scrolled to the left or right, respectively, or if the trackball is scrolled up or down regardless of the location of the cursor. For example, if the cursor is positioned to the right of the text in text entry box 603 as shown in the first frame of FIG. 6*b* and the user scrolls right, a new text entry field 604 is selected. However, in one embodiment, if the user scrolls left in this situation, the cursor will responsively move one character at a time through the text within the text entry box 602 until it reaches the beginning of the text.

Alternatively, in one embodiment, scrolling the trackball will cause another field to be highlighted regardless of the position of the cursor. In this embodiment, the cursor is moved via the directional pad rather than the trackball.

Text Selection

Figure 7:
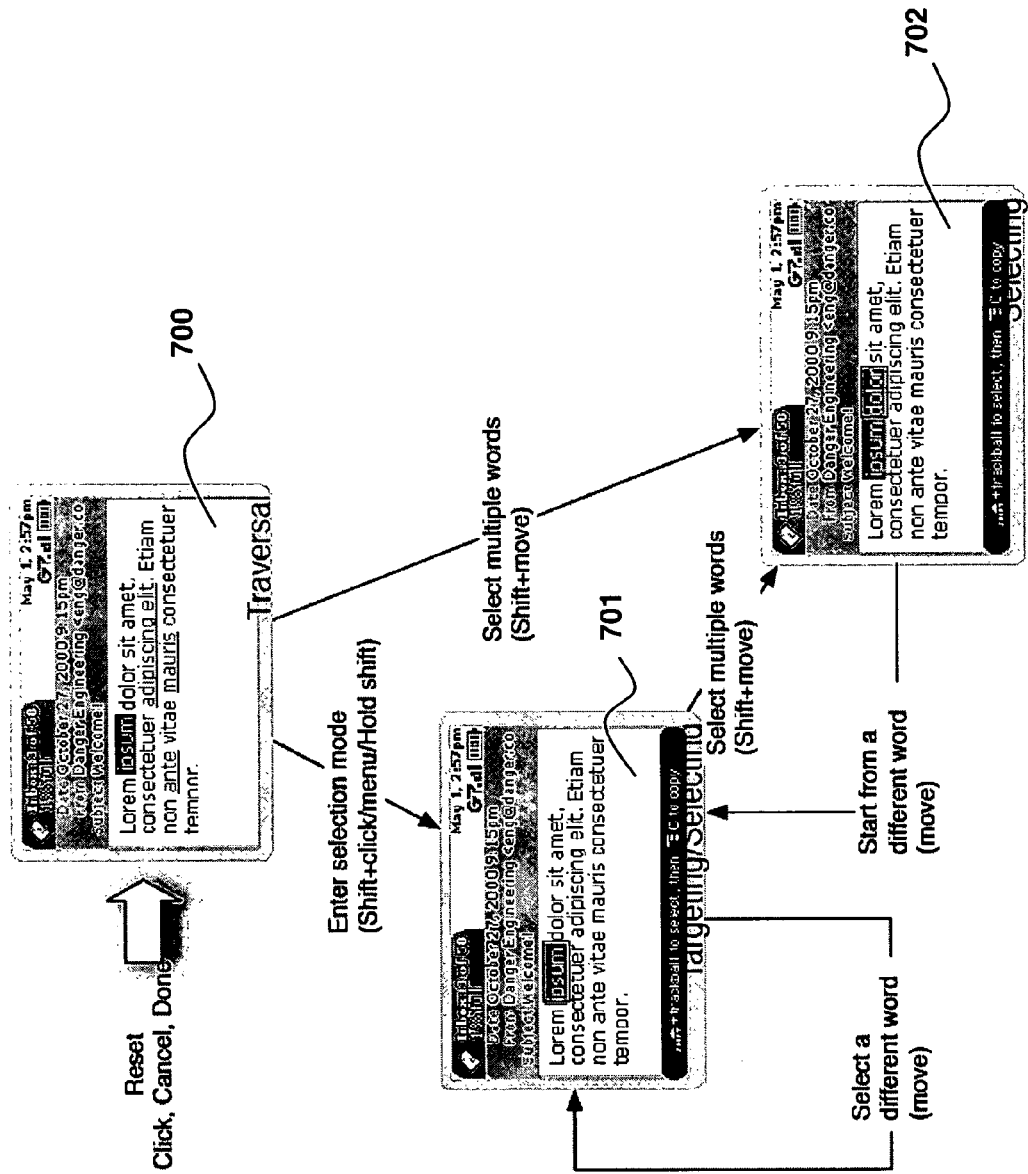
FIG. 7 illustrates one embodiment of the invention for selecting text within a graphical user interface.

One embodiment of the invention provides techniques to select text using the trackball 301 when in a "reading" mode such as, for example, when viewing a Web page or email message. These techniques will be described with respect to FIG. 7.

In this embodiment, the user is reading a page of an email message containing text, hyperlinks and graphics. Three modes of operation are provided for navigating the page—a "standard" mode, a "targeting/selecting" mode (hereinafter "targeting" mode), and a "selection" mode. When in the standard mode shown in window 700, only hyperlinks are selected in response to movement of the trackball 301. That is, in response to the user scrolling the trackball, the highlighter will jump from one hyperlink to the next, bypassing all non-hyperlinked text. This mode may be used to standard Web browsing operations.

In one embodiment, the user may cause the device to enter the "targeting" mode by selecting a command from a menu, or pressing and/or holding down a specified shortcut key (e.g., the shift key from the keyboard 306). When in targeting mode, both hyperlinked text, non-hyperlinked text and graphical elements are selected in response to the trackball movement. Specifically, as the user moves the trackball, the highlighter highlights each word in succession in the direction of the trackball motion (rather than just hyperlinked words). As illustrated in window 701, the highlighter may change color and the formatting used for the hyperlinked words may change to indicate that the device is in the targeting mode. The user may position the start of the desired text selection point in either standard mode (if the start is a hyperlink) or targeting mode.

Once the start of the desired text selection point is identified, the user can enter into the selection mode by moving the trackball while holding down a specified shortcut key (e.g. Shift) to select a piece of contagious text. In one embodiment, while holding down the designated shortcut key, each additional word in succession will be highlighted along with the currently selected word(s). This is illustrated graphically in window 702. The user may then copy the text (e.g., using a copy command from the menu or designated key combination), or return to the positioning state by releasing the shortcut key and moving the trackball so that another piece of text can be selected.

Selecting on a word-by-word basis as described above is efficient and less error-prone than selecting on a character-by-character basis. However, the underling principles of the invention may still be implemented using character-by-character selection.

Assuming a word-by-word selection is employed, in one embodiment a "word" is defined to be any of the following: (a) one or more letters, (b) one or more digits, blocks of spaces, (c) one punctuation/symbol/special characters. In this way, the majority of text selection circumstances are easily captured. The foregoing features are illustrated in FIG. 8 which shows an exemplary sequence of numbers, letters and other characters: sapien123 1-2234-566!!!. In response to the targeting motion described above, the "sapien" sequence of characters is logically separated from the set of numbers which follow ("123"). This is true even though no space exists between the letters and numbers. As the user holds down the designated control key (e.g., Shift) and scrolls the wheel to the right, the following characters are selected in succession: 123, space, 1, -, 2234, -, 566, !, !, !. Thus, the system selects numbers separated by dashes in groups (e.g., 2234), and highlights special characters such as the dashes, spaces and exclamation points individually. The purpose of the foregoing algorithm is to provide a selection mechanism which is both efficient and which reflects selections which are most likely intended by the user (e.g., it is unlikely that the user would want to highlight only a portion of 2234 in the example above).

Browser Navigation

In one embodiment, special link navigation features are provided to improve Web browser navigation. For example, on certain Web pages on mobile devices, hyperlinks may be positioned arbitrarily and may have various sizes and lengths. Consequently, users may have a problem knowing which link will be highlighted after they roll the trackball up, down, left or right. For example, in FIG. 9*a*, the mail icon 901 is the currently highlighted link but it is unclear which link will become highlighted when the user scrolls down (e.g., Movies or Horoscopes).

Figure 9B:
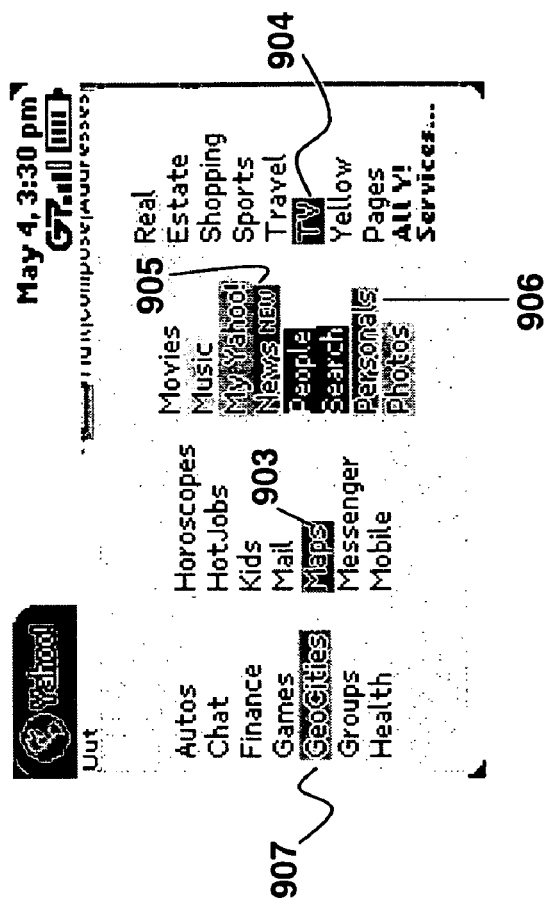
FIGS. 9a-b illustrate additional navigation techniques employed within a graphical user interface according to one embodiment of the invention.
Figure 9A:
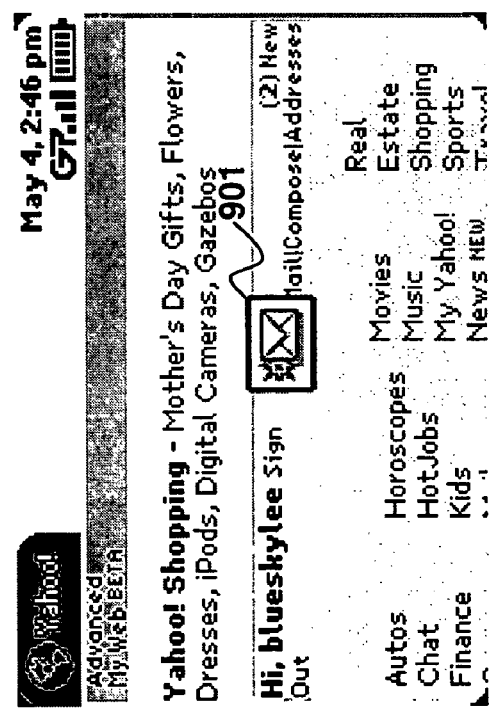

To solve these problems, one embodiment of the invention visually identifies the links which will be selected in response to a trackball motion moving away from the current link. In FIG. 9*b*, the current link is "People Search" 902. To provide an indication of the links which will be selected if the user scrolls the trackball, the potential links are highlighted in a transparent color. In addition, to differentiate the different directions of movement the links to the left/right are provided with different colors than the links above/below the current link 902. In the illustrated example, the Map link 903 and the TV link 904 are colored purple and the News link 905 and the Personals link 906 are colored gray. In addition, in one embodiment, the further away the link is from the current element, the higher the transparency value associated with the link (e.g., the Geocities link 907 has a higher transparency value, and is therefore more transparent, than the Maps link 903). As the user move to a new link, the highlights are regenerated accordingly.

Logical Barriers

One embodiment of the invention employs logical barriers between windows and other graphical elements to prevent the user from inadvertently navigating in the wrong direction. For example, if the user intends to scroll down a menu structure with the trackball 301 and inadvertently scrolls to the right or left, these embodiments of the invention do not immediately register the right and/or left input.

Figures 10A, 10B:
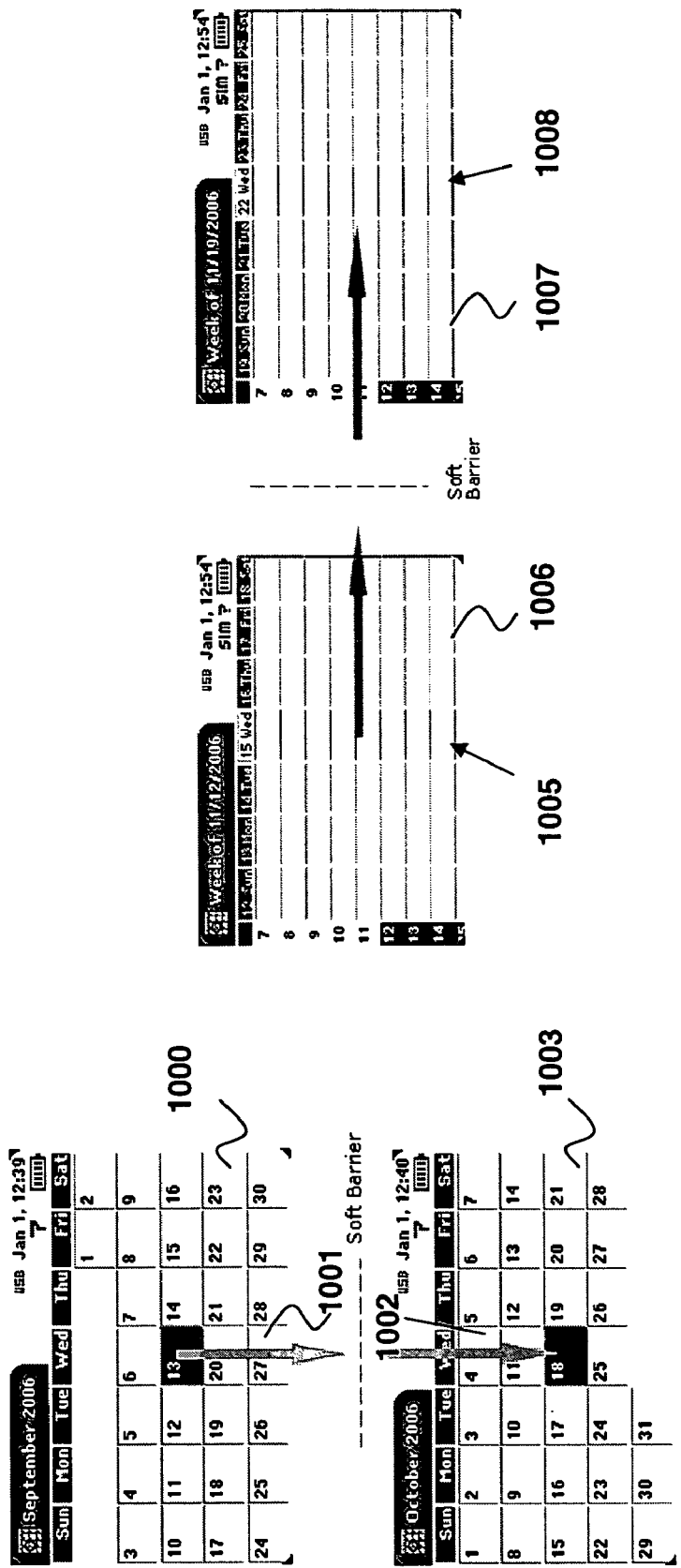
FIGS. 10a-e illustrate the implementation of logical boundaries according to one embodiment of the invention.

FIGS. 10*a-b* illustrate one embodiment of a logical barrier between two months of a calendar program. In FIG. 10*a*, the month of September is shown in window 1000 and the month of October is shown in window 1003. In this particular example, the user scrolls down on the trackball from September 13 to September 27 (block 1001). Once September 27 has been highlighted, the logical barrier will initially prevent the highlight from moving to the October window 1003 in response to additional downward scrolling motion. In one embodiment, the logical barrier comprises a short duration of time (e.g., $4/10$ second, $1/2$ second, etc) during which the user may continue to scroll downward without any effect. Alternatively, or in addition, the logical barrier comprises a specified amount of rotation in the downward direction (e.g., a specified number of downward "clicks" on the trackball). After the short duration of time and/or amount of downward motion, an additional downward scroll on the trackball 301 will move the highlight to the October 4 date 1002 within the October window 1003. In one embodiment, the logical barriers are user-configurable, allowing the user to specify whether a specified amount of time and/or a measurable downward scroll is to be used as the logical barrier.

FIG. 10*b* illustrates the same general principles with a weekly calendar view. In this example, a Wednesday, November 15 entry 1005 is initially selected within the week of Nov. 12, 2006 (window 1006). In response to scrolling the trackball to the right, each of the days from Nov. 15 to Nov. 18 are highlighted in succession. When the final day within the window 1006 is highlighted (Nov. 18), a logical barrier will initially prevent the next window 1008 to be displayed in response to additional rightward trackball motion. After a specified amount of time (e.g., $4/10$ second, $1/2$ second, etc) and/or a specified amount of additional rightward motion on the trackball, the cursor will move to the first date entry 1007 in the new window 1008.

Figure 10D:
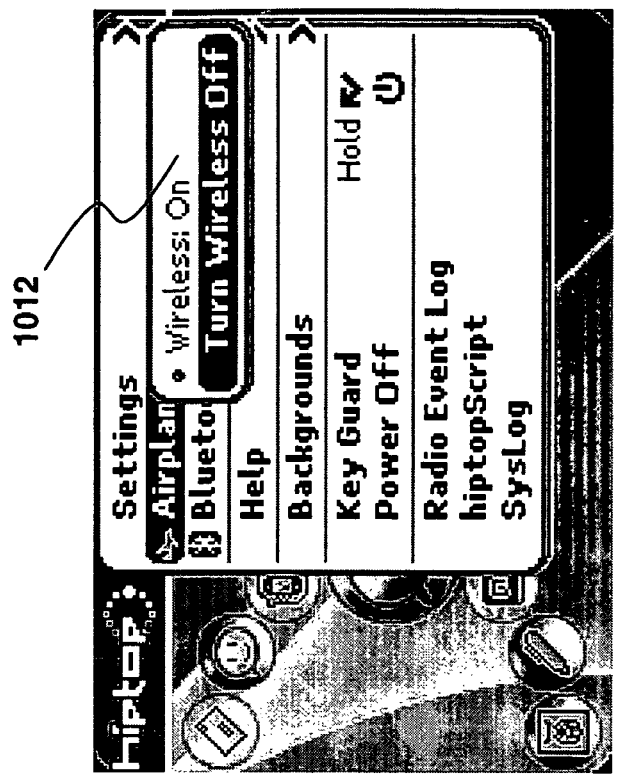
Figure 10C:
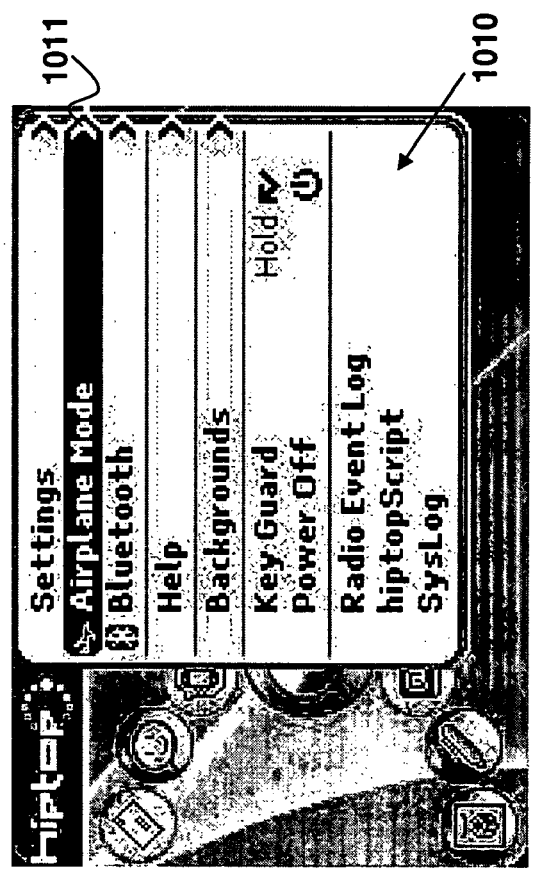
Figure 10E:

FIGS. 10*c-e* illustrate a particular type of logical barrier referred to as a "rail guard" for preventing inadvertent trackball movements within a hierarchical menu structure according to one embodiment of the invention. Specifically, FIG. 10*c* shows a drop down menu 1010 with a plurality of selectable elements which may be selected via an up/down scrolling motion on the trackball 301. Certain elements, such as element 1011, have sub-elements associated with them (as indicated by the right-pointing arrow displayed on some of the elements). The user scrolls right on the trackball 301 when the element 1011 is highlighted to expose the sub-elements. For example, scrolling right when element 1011 bring up a set of "Airplane Mode" sub-elements, as illustrated in FIG. 10*d*.

In one embodiment of the invention, the "rail guard" logical barrier is configured on each element to prevent the sub-elements from being exposed in response to an inadvertent right/left scrolling motion. More specifically, the sub-elements will be selected in response to a rightward motion only after a specified amount of time after the vertical motion has stopped (e.g., $2/10$ of a second). Thus, any horizontal motion which occurs within the specified amount of time after vertical motion stops is deemed accidental and is ignored. Alternatively, or in addition, the sub-elements may be selected only after a specified amount of additional rightward motion on the trackball.

In one embodiment of the invention, the same concepts are applied to the graphical, circular menu structure such as the one illustrated in FIG. 10*e*. That is, certain menu elements such as element 1020 have sub-elements associated with them which will be selected in response to a rightward motion only after a specified amount of time and/or a specified amount of additional rightward motion on the trackball.

The end result of the logical barriers described above is that inadvertent motion by a user at the edge of a window or other graphical element will not cause unwanted movements into an adjacent window and/or other graphical element, respectively, thereby improving the navigation experience for the user.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A device having a memory for storing program code and a processor for processing the program code to generate a graphical user interface (GUI), the GUI comprising:
   a first predefined display region;
   a second predefined display region; and
   a logical barrier between the first predefined display region and the second predefined display region, the logical barrier configured to temporarily prevent movement from a selectable graphical element in the first predefined display region to a selectable graphical element in the second predefined display region responsive to input from a trackball directed towards the selectable graphical element in the second predefined display region, the logical barrier temporarily preventing the movement for a specified amount of rotation of the trackball directed towards the selectable graphical element in the second predefined display region, the second predefined display region not visible when the first predefined display region is visible on a display of the device, and the first predefined display region not visible when the second predefined display region is visible on the display of the device.

2. The device of claim 1, wherein the first predefined display region and the second predefined display region each individually occupy the entire display of the device.

3. The device of claim 1, wherein:
the first predefined display region comprises a first month within a graphical calendar interface, and the selectable graphical element in the first predefined display region comprises a calendar entry in the first month within the graphical calendar interface; and
the second predefined display region comprises a second month within the graphical calendar interface, and the selectable graphical element in the second predefined display region comprises a calendar entry in the second month within the graphical calendar interface.

4. The device of claim 1, wherein:
the first predefined display region comprises a first menu, and the selectable graphical element in the first predefined display region comprises a selectable menu element; and
the selectable graphical element in the second predefined display region comprises a selectable sub-element associated with the selectable menu element.

5. A method for navigating through a graphical user interface displayed on a display device, the method implemented in a computer device that includes at least a memory and a processor, the method comprising:
providing a first predefined display region;
providing a second predefined display region; and
temporarily preventing movement from a selectable graphical element in the first predefined display region to a selectable graphical element in the second predefined display region responsive to input from a trackball directed towards the graphical element in the second predefined display region, the movement being prevented for a specified amount of rotation of the trackball directed towards the selectable graphical element in the second predefined display region, the second predefined display region not visible when the first predefined display region is visible on the display device, and the first predefined display region not visible when the second predefined display region is visible on the display device.

6. The method of claim 5, wherein the first predefined display region and the second predefined display region each individually occupy the entire display of the display device.

7. The method of claim 5 wherein:
the first predefined display region comprises a first month within a graphical calendar interface, and the selectable graphical element in the first predefined display region comprises a calendar entry in the first month within the graphical calendar interface; and
the second predefined display region comprises a second month within the graphical calendar interface, and the selectable graphical element in the second predefined display region comprises a calendar entry in the second month within the graphical calendar interface.

8. The method of claim 5, wherein:
the first predefined display region comprises a first menu, and the first plurality of selectable graphical element in the first predefined display region comprises a selectable menu element; and
the selectable graphical element in the second predefined display region comprises a selectable sub-element associated with the selectable menu element.

\* \* \* \* \*